UNITED STATES PATENT OFFICE.

PAUL SEIDEL, OF LUDWIGSHAFEN, GERMANY, ASSIGNOR TO BADISCHE ANILIN AND SODA FABRIK, OF LUDWIGSHAFEN, GERMANY, A CORPORATION.

INDIGO PASTE.

SPECIFICATION forming part of Letters Patent No. 692,720, dated February 4, 1902.

Application filed June 15, 1900. Serial No. 20,433. (No specimens.)

*To all whom it may concern:*

Be it known that I, PAUL SEIDEL, doctor of philosophy, a subject of the King of Saxony, residing at Ludwigshafen-on-the-Rhine, in the Kingdom of Bavaria, Germany, have invented new and useful Improvements in Indigo Paste, of which the following is a specification.

In the preparation of indigo in paste form for commercial purposes from pure indigo—for example, synthetical or refined plant indigo—it has hitherto proved difficult to obtain a concentrated paste containing, say, twenty to forty per cent. of indigo which is at the same time sufficiently liquid to be poured and does not deposit the indigo as a precipitate. Especially troublesome in this respect is the tendency of pure indigo to form a froth when being made into a paste with water. I have found that this difficulty may be remedied and a mobile and non-settling paste obtained by adding a very small quantity of a thickening agent (protein or gummy substance) to the indigo which is to be brought into the paste form. For this purpose the following substances are suitable: bone-glue, skin-glue, fish-glue, silk-gum, albumen, casein, gluten, gelatin, gum solution, starch, dextrine, and the like, and it is desirable that the indigo paste be neutral or alkaline. In this way concentrated pastes may be obtained which are sufficiently liquid to be poured and do not deposit indigo.

The following examples serve to show how my invention may be carried into practical effect. The parts are by weight.

Example 1: Gradually add while well stirring one thousand (1,000) parts of indigo press-cake containing forty per cent. of indigo to a solution of two (2) parts of gum in five hundred (500) parts of water. The mass is soon resolved into an even thick paste which can be brought to the consistency of twenty per cent., preferably used, by the further addition of five hundred (500) parts of water.

Example 2: Add a solution of one (1) part of gum in one thousand (1,000) parts of water to four hundred (400) parts of indigo-powder in a suitable grinding apparatus and thereupon two parts of caustic-soda lye, (containing about fourteen per cent. of NaOH.) Set the apparatus in motion. The indigo soon becomes moist and in a short time is ground up to an even paste, which can be diluted with water to any desired strength.

Now what I claim is—

1. As a new product the composition of matter consisting of indigo, a thickening agent, and water, which is liquid when containing twenty to forty per cent. of indigo, and does not deposit a precipitate of indigo, substantially as described.

2. As a new product the composition of matter consisting of twenty per cent. of indigo, and one-fifth per cent. of gum and of water, substantially as described.

In testimony whereof I have hereunto set hand in the presence of two subscribing witnesses.

PAUL SEIDEL.

Witnesses:
ERNEST E. EHRHARDT,
ALEXANDER ALLBRECHT.